United States Patent
Ratnakaram et al.

(10) Patent No.: US 11,599,627 B2
(45) Date of Patent: Mar. 7, 2023

(54) SYSTEM EMPLOYING SMART DEVICE FOR SECURE AND AUTHENTICATED EVENT EXECUTION

(71) Applicant: Bank of America Corporation, Charlotte, NC (US)

(72) Inventors: Udaya Kumar Raju Ratnakaram, Hyderabad (IN); Nagasubramanya Lakshminarayana, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 185 days.

(21) Appl. No.: 16/207,524

(22) Filed: Dec. 3, 2018

(65) Prior Publication Data
US 2020/0175154 A1    Jun. 4, 2020

(51) Int. Cl.
*H04L 29/00* (2006.01)
*G06F 21/54* (2013.01)

(52) U.S. Cl.
CPC .................... *G06F 21/54* (2013.01)

(58) Field of Classification Search
CPC ...................................... G06F 21/54
USPC ......................................... 726/26
See application file for complete search history.

(56) References Cited

U.S. PATENT DOCUMENTS

| | | |
|---|---|---|
| 5,677,955 A | 10/1997 | Doggett et al. |
| 5,757,917 A | 5/1998 | Rose et al. |
| 6,000,832 A | 12/1999 | Franklin et al. |
| 6,058,373 A | 5/2000 | Blinn et al. |
| 6,246,996 B1 | 6/2001 | Stein et al. |
| 6,327,578 B1 | 12/2001 | Linehan |
| 6,675,153 B1 | 1/2004 | Cook et al. |
| 7,058,611 B2 | 6/2006 | Kranzley et al. |
| 7,483,858 B2 | 1/2009 | Foran et al. |
| 8,191,766 B2 | 6/2012 | Tomchek et al. |
| 8,249,985 B2 | 8/2012 | Giordano et al. |
| 8,626,642 B2 | 1/2014 | Foss, Jr. et al. |
| 8,818,907 B2 * | 8/2014 | Bonalle ............... G06Q 20/108 705/65 |
| 9,262,612 B2 | 2/2016 | Cheyer |
| 9,542,671 B2 | 1/2017 | Tien et al. |
| 9,613,358 B1 | 4/2017 | Gardner |
| 9,646,614 B2 | 5/2017 | Bellegarda et al. |
| 9,710,805 B2 | 7/2017 | Chaitanya |

(Continued)

*Primary Examiner* — Brandon Hoffman
*Assistant Examiner* — Michael D Anderson
(74) *Attorney, Agent, or Firm* — Moore & Van Allen PLLC; Thomas R. Parker, II

(57) ABSTRACT

Embodiments of the present invention provide a system for employing a smart device for secure and authenticated event. The system may include a smart assistant device that receives an audible request from a user for an event with a merchant. The smart assistant device then establishes a secure active session with a mobile device associated with the user over a wireless network. The smart assistant device determines a digital voice ID for the received audible request for the event and transmits the digital voice ID and event information to the mobile device of the user. A smart assistant application of the mobile device validates the digital voice ID based on stored reference data. Event information and additional user execution information is then provided to an event processing system for asynchronous processing.

17 Claims, 9 Drawing Sheets

(56) References Cited

U.S. PATENT DOCUMENTS

| | | | |
|---|---|---|---|
| 2009/0205033 A1* | 8/2009 | Lapsley | G07C 9/37 726/7 |
| 2011/0047038 A1 | 2/2011 | Halevi | |
| 2013/0262307 A1 | 10/2013 | Fasoli et al. | |
| 2013/0282565 A1 | 10/2013 | Barta et al. | |
| 2016/0224983 A1* | 8/2016 | Cash | G06Q 20/385 |

* cited by examiner

SYSTEM EMPLOYING SMART DEVICE FOR SECURE AND AUTHENTICATED EVENT EXECUTION

BACKGROUND

Smart devices, including voice assistant devices, voice assistant applications, and the like, are being utilized to execute events on behalf of their users, especially with respect to common or frequent events. However, because executing events through voice assistant devices generally requires voiced or otherwise audible commands, personal information security concerns (e.g., voice squatting and voice masquerading) are an important problem that need to be addressed for improved adoption and confidence in event executions via smart devices. Additionally, as voice assistant devices may be third party devices that initiate, but do not facilitate or execute, the events, users experience friction in their ability to easily manage characteristics of the events that they wish to execute. Therefore, a system that employs smart devices to execute events in a secure and authenticated manner, while also removing barriers or hurdles in managing the characteristics of the executed events, would address the issues currently present with smart device technology.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for employing a smart device for secure event execution. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve a smart assistant application module comprising a memory device and a processing device operatively coupled to the memory device configured to execute computer-readable program code to perform certain actions herein. The smart assistant application module of the system may then receive, from a smart assistant device, a digital voice identification code associated with an audible transaction request, a smart assistant device identification code, and one or more transaction tokens. The smart assistant application module of the system then validates the digital voice identification code associated with the audible transaction request as being associated with a user. Next, the smart assistant application module of the system receives, from the smart assistant device, encrypted transaction details associated with the audible transaction request. The smart assistant application module of the system may then decrypt the encrypted transaction details associated with the audible transaction request and determine a financial instrument of the user for executing the audible transaction request. Finally, the smart assistant application module of the system transmits the transaction details and information about the determined financial instrument of the user for executing the audible transaction request to a financial institution server for execution of the transaction associated with the audible transaction request.

In some embodiments, the system includes a smart assistant device module that receives the audible transaction request from the user and obtains transaction details associated with the audible transaction request from a merchant system. The smart assistant device module may then establish a secured active session with the computing device of the user over a wireless network. The smart assistant device module can then determine a digital voice ID for the received audible transaction request. Next, the smart assistant device module transmits (1) the digital voice ID for the received audible transaction request, (2) a smart assistant device ID, and (3) one or more generated transaction tokens to the computing device of the user. Finally, in some embodiments, the smart assistant device module encrypts and transmits the transaction details associated with the audible transaction request to the computing device of the user.

In some embodiments of the system, validating the digital voice identification code associated with the audible transaction request as being associated with the user is based on stored customer reference data and a smart assistant device identification code associated with the smart assistant device.

Additionally or alternatively, in some embodiments of the system, decrypting the encrypted transaction details is conducted based on a smart device identification code or a predetermined encryption key.

Furthermore, in some embodiments of the system, determining the financial instrument of the user for executing the audible transaction requests comprises prompting a computing device of the use to display selectable icons that are each associated with one or more financial instruments of the user, and the system may then receive an indication from the computing device of the user that the user selected the financial instrument of the user for executing the audible transaction request.

In some embodiments of the system, the step of determining the financial instrument of the user for executing the audible transaction request comprises identifying a predetermined preferred financial instrument of the user, and then determining that the predetermined preferred financial instrument of the user is an acceptable transaction mechanism based on the transaction details associated with the audible transaction request.

In some embodiments, the processing device of the smart assistant application module is further configured to execute computer-readable program code to, in response to transmitting the transaction details and the information about the determined financial instrument of the user for executing the audible transaction request to a financial institution server, transmit a notification to the merchant system with (1) an indication that the user is authorized for the transaction, (2) a transaction session code, (3) and a transaction identification token.

Finally, the processing device of the smart assistant application may be further configured to cause a user interface of a user computing device to display a notification of at least an indication that the transaction has been executed and an amount of the transaction in response to transmitting the transaction details and the information about the determined financial instrument of the user for executing the audible transaction request to a financial institution server.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Reference will now be made to the accompanying drawings, wherein.

DETAILED DESCRIPTION OF EMBODIMENTS OF THE INVENTION

Figure 1:
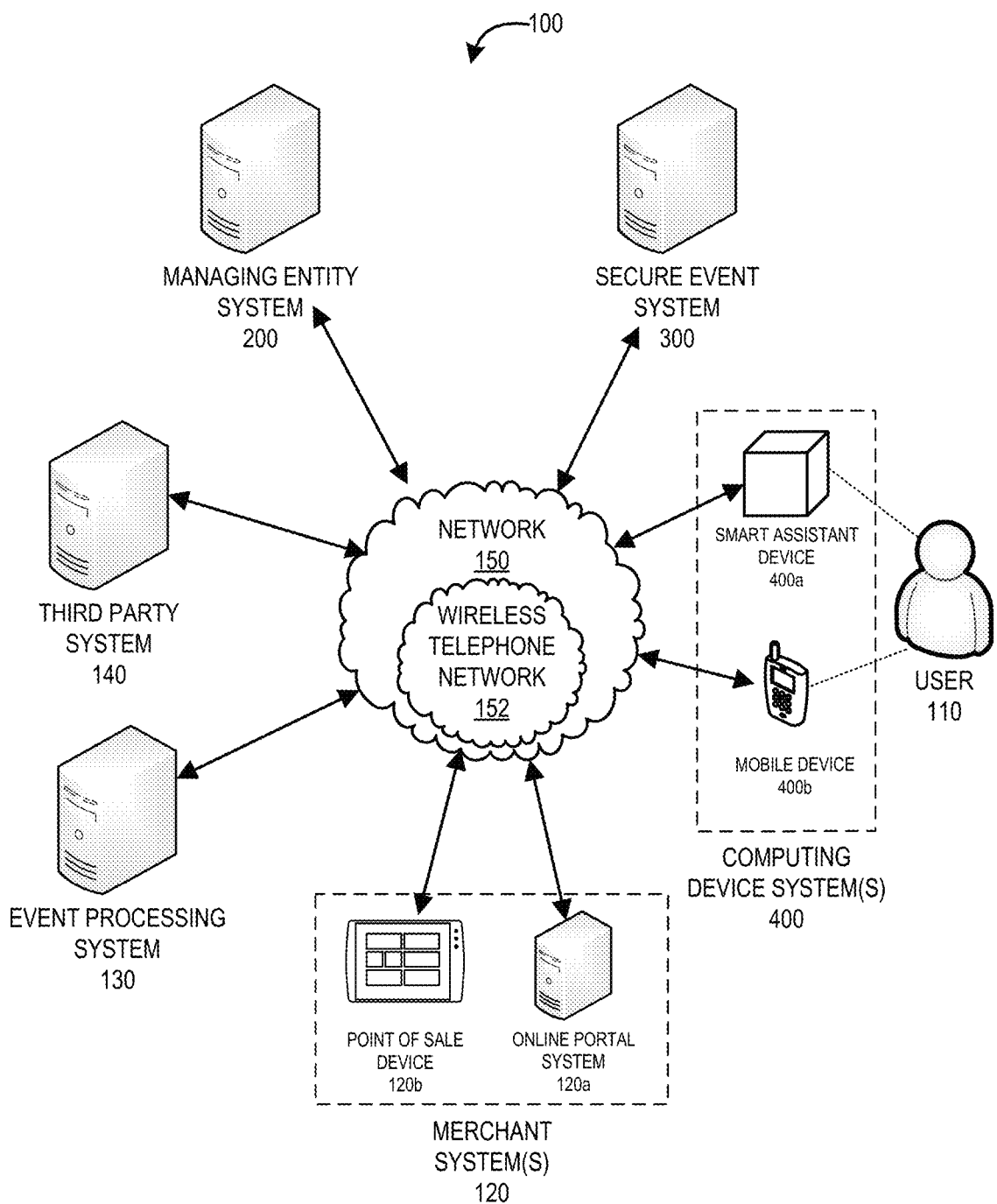
FIG. 1 provides a block diagram illustrating a system environment for secure transfer of encrypted resources and asynchronous execution, in accordance with an embodiment of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for employing a smart device for secure and authenticated event, where financial data of the user is not provided to the merchant or a third party, and where the merchant system may be configured to perform asynchronous operations for the execution of the transaction, permitting the merchant system to continue performing other useful operations while a financial institution system handles the authorization and execution of the transaction. In general, a user initiates a transaction with a merchant, either through an online portal or with a point of sale or other computing device associated with a merchant location. As part of the transaction initiation, the user requests to execute the transaction through a secure manner that does not require that the user provide financial or overly sensitive user information to the merchant or any third party entity (excluding the financial institution from which the user has a financial account that will be used for the transaction). As part of this transaction initiation, the system (e.g., the merchant system, a system associated with the financial institution, or the like) may identify, or the user may provide, customer contact information in the form of a phone number, email address, or the like.

The system also identifies certain transaction information like the purchase price, the product or service that is part of the transaction, a transaction location, a period of time during which the transaction can occur, and the like. Importantly, the user has not provided any financial or personal information to the merchant system, apart from the contact information. The system then encrypts the initial transaction information and transmits the encrypted initial transaction information to a computing device associated with the user contact information (e.g., via an email message, a text message, or the like to a mobile device, laptop computer, or the like). Once the merchant system has transmitted the initial transaction information to the computing device of the user (either directly or via the financial institution system), the merchant system can move on to conduct other important operations and does not need to wait for an authorization or confirmation response from other systems to proceed its normal operations. This asynchronous nature of the merchant system's operations free the system up to perform more operations in the same amount of time that a system performing synchronous transaction operations would, because it does not pause its operations while a transaction is being processed, like the synchronous transaction system does.

A software application stored on the computing device of the user accesses the encrypted message, decrypts the message to identify the initial transaction information and determines a payment method and/or instrument of the user to be used to complete the transaction. This determination of the payment method or instrument may comprise identifying a pre-selected instrument for transactions executed in this manner. In other embodiments, the system may cause the application to prompt the user for user input of a selection of one of a plurality of available payment methods or instruments to complete the transaction.

Once the payment method or instrument has been identified, the system causes the application to submit full transaction information (e.g., the initial transaction information, an authentication and/or verification of the user and/or user account, and the selected payment method or instrument) to a transaction processing server of the financial institution. This submission may also be encrypted. Again, the financial information of the user, including security information like a personal identification number, biometric information, passcode information, and the like, still are not distributed to the merchant, the merchant system, or any entity other than the financial institution entity that originated the payment method and/or instrument and which already has records of the financial and security information of the user associated with the payment method.

The financial institution transaction processing server then executes the transaction and, if not already generated, generates a reference code or number for the particular transaction. This reference code, the initial transaction information, time stamp information, and any other reference-type information can then be transmitted to the merchant to confirm that the transaction has successfully occurred and give the merchant system a way to subsequently check transactions with the financial institution, all without providing sensitive financial or personal information of the user to the merchant or any other third party.

Similarly, the system can provide a confirmation of the completeness of the transaction to the computing device of the user, including the reference code, the transaction amount, and any other information that the user may find useful for its records.

FIG. 1 provides a block diagram illustrating a system environment 100 for secure transfer of encrypted resources and asynchronous execution, in accordance with an embodiment of the invention. As illustrated in FIG. 1, the system environment 100 includes a managing entity system 200, a secure event system 300, one or more computing device systems 400 (e.g., smart assistant device 400a or mobile device 400b), one or more merchant systems 120 (e.g., online portal system 120a or point of sale device 120b), an event processing system 130, and one or more third party systems 140. One or more users 110 may be included in the system environment 100. In some embodiments, the user(s) 110 of the system environment 100 may be customers of a merchant associated with the merchant system(s) 120. These users 110 may also have one or more accounts (e.g., financial accounts) or financial payment instruments (e.g., credit cards, debit cards, and the like) with the managing entity system 200, or may otherwise have a relationship with payment methods associated with the managing entity system 200.

The managing entity system 200, the secure event system 300, the computing device system(s) 400, the merchant system(s) 120, the event processing system 130, and/or the third party system(s) 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the secure event system 300, the computing device system(s) 400, the merchant system(s) 120, the event processing system 130, and/or the third party system(s) 140 across the network 150. For example, the managing entity system 200 may cause the secure event system 300, computing device system(s) 400, merchant system(s) 120, event processing system 130, and/or the third party system(s) 140 to perform certain actions of the processes described herein. Of course, the managing entity system 200 may be configured to perform (or instruct other systems to perform) one or more other process steps described herein. The managing entity system 200 is described in more detail with respect to FIG. 2.

The secure event system 300 may be a system owned or controlled by the managing entity and/or a third party that specializes in data security, data encryption, secure communication between computing devices, merchant devices, and/or computing devices associated with the managing entity, or the like. In general, the secure event system 300 is configured to communicate information or instructions with the managing entity system 200, the computing device system(s) 400, the merchant system(s) 120, the event processing system 130, and/or the third party system(s) 140 across the network 150. For example, the secure event system 300 may encrypt initial transaction data and transmit the encrypted transaction data to computing device(s) associated with a user 110. Of course, the secure event system 300 may be configured to perform (or instruct other systems to perform) one or more other process steps described herein. The secure event system 300 is described in more detail with respect to FIG. 3.

The computing device system(s) 400 may be one or more systems owned or controlled by the managing entity and/or a third party that specializes in providing computing devices, mobile computing devices, and the like. These computing device systems may be owned or created by one or more third party entities, and may be owned or otherwise managed by the users (e.g., user 110) associated with this system environment 100. In general, the computing device system(s) 400 are configured to communicate information or instructions with the managing entity system 200, the secure event system 300, the merchant system(s) 120, the event processing system 130, and/or the third party system(s) 140 across the network 150. For example, the computing device system(s) 400 may receive encrypted transaction data in the form of messages, decrypt message data, prompt the associated user(s) 110 to provide payment method or instrument data, and transmit certain data to the event processing system 130. Of course, the computing device system(s) 400 may be configured to perform (or instruct other systems to perform) one or more other process steps described herein. A sample computing device system 400 is described in more detail with respect to FIG. 4.

The merchant system(s) 120 may be one or more computing devices, computing network systems, point of sale devices (e.g., the point of sale device 120b), online portal systems (e.g., the online portal system 120a), and the like. These merchant systems 120 are configured to receive information from the computing device systems 400 associated with the one or more users 110 and transmit initial transaction information with the computing device systems 400 of the users 110, the managing entity system 200, and/or the secure event system 300. The merchant systems 120 are also configured to initiate, provide information for the purpose of executing, and executing transactions between a merchant associated with the merchant system(s) 120 and the users 110. As such, the merchant systems 120 may a data encryption application, a message encryption application, and secure communication applications for communication between the computing device system(s) 400, the managing entity system 200, the secure event system 300, the event processing system 130, and/or the third party system(s) 140.

The event processing system 130 may be a system owned or controlled by the managing entity of the managing entity system 200 and/or a third party that specializes in financial transaction ("event") executions, the processing of transactions or other events, and the like. In some embodiments, at least a portion of the event processing system 130 is included within or otherwise managed by the managing entity system 200. In general the event processing system 130 is configured to communicate information or instructions with the managing entity system 200, the secure event system 300, the computing device system(s) 400, the merchant system(s) 120, and/or the third party system(s) 140.

The third party system(s) 140 may be any system that interacts with the system environment 100 to enable the other systems to operate in the manners described herein. For example, one third party system 140 may comprise a receiving financial institution entity system (e.g., a system associated with a financial institution that is associated with the merchant system(s) 120). Additionally or alternatively, one embodiment of the third party system 140 comprises a data security and communication security system that enables the managing entity system 200 and/or the merchant system(s) 120 to transmit transaction information (e.g., initial transaction information) to the computing device system(s) 400 associated with a user 110.

Figure 2:
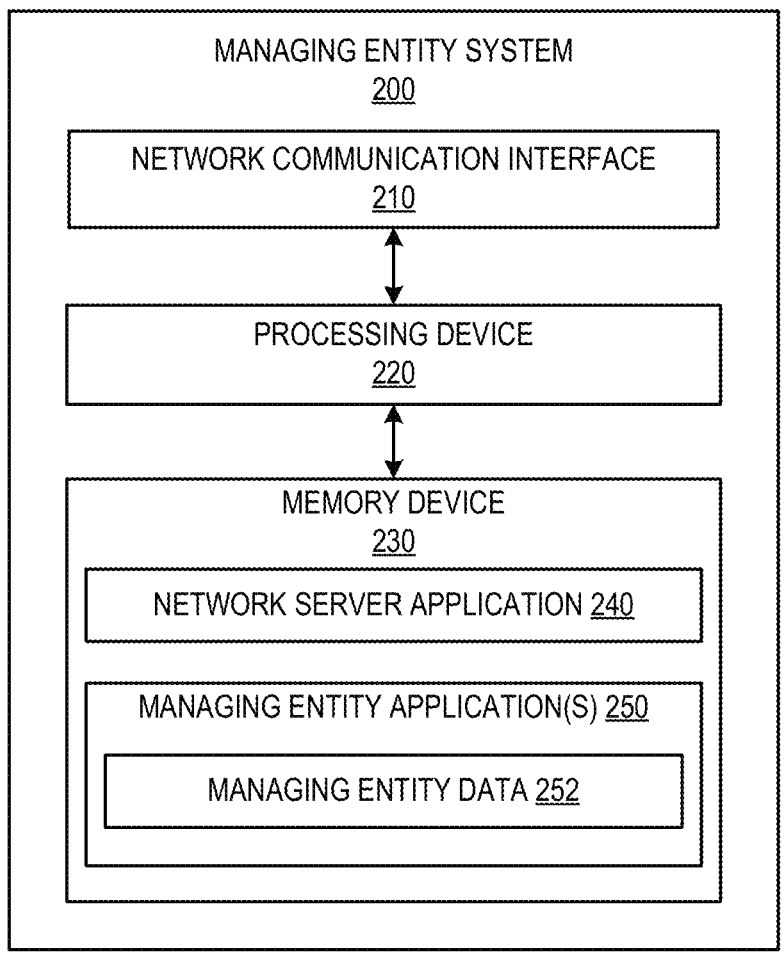
FIG. 2 provides a block diagram illustrating the managing entity system of FIG. 1, in accordance with an embodiment of the invention.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240 and one or more managing entity applications 250 that include managing entity data 252, and other computer-executable instructions or other data. The computer-executable program code of the network server application 240 and/or the managing entity application(s) 250, may instruct the processing device 220 to perform certain logic, data-processing, and data-storing functions of the managing entity system 200 described herein, as well as communication functions of the managing entity system 200.

The managing entity application(s) 250 may be configured to utilize managing entity data 252 stored within the managing entity system 200 and/or other data that is accessible to the managing entity system 200 within the network 150 to perform the one or more functions described herein. One example of a managing entity application 250 comprises a communication and/or managing application that is configured to perform the one or more actions (or cause other computing devices or systems described herein) described in the process 800 of FIG. 8 and/or process 900 of FIG. 9.

The network server application 240 and the managing entity application 250 are configured to invoke or use the managing entity data 252 and the like when communicating through the network communication interface 210 with the secure event system 300, the computing device system(s) 400, the merchant system(s) 120, the event processing system 130, and/or the third party system(s) 140.

The network communication interface 210 is a communication interface having one or more communication devices configured to communicate with one or more other devices on the network 150, such as the secure event system 300, the computing device system(s) 400, the merchant system(s) 120, the event processing system 130, the third party system(s) 140, and the like. The processing device 220 is configured to use the network communication interface 210 to transmit and/or receive data and/or commands to and/or from the other devices connected to the network 150.

Figure 3:
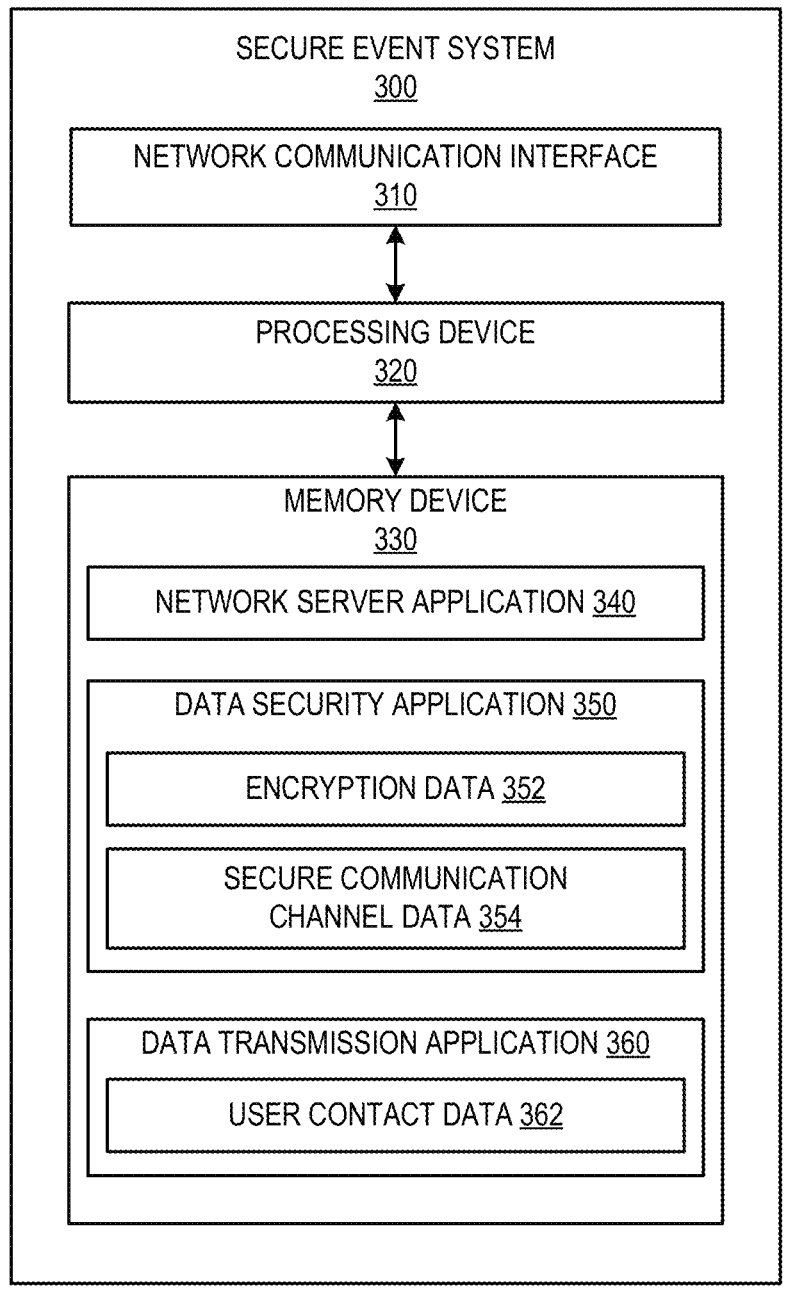
FIG. 3 provides a block diagram illustrating the secure event system of FIG. 1, in accordance with an embodiment of the invention.

FIG. 3 provides a block diagram illustrating the secure event system 300, in greater detail, in accordance with embodiments of the invention. As illustrated in FIG. 3, in one embodiment of the invention, the secure event system 300 includes one or more processing devices 320 operatively coupled to a network communication interface 310 and a memory device 330. In certain embodiments, the secure event system 300 is operated by a first entity, such as a financial institution, while in other embodiments, the secure event system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the secure event system 300 described herein. For example, in one embodiment of the secure event system 300, the memory device 330 includes, but is not limited to, a network server application 340, a data security application 350 which includes encryption data 352 and secure communication channel data 354, a data transmission application 360 which includes user contact data 362, and other computer-executable instructions or other data. The computer-executable program code of the network server application 340, the data security application 350, and/or the data transmission application 360 may instruct the processing device 320 to perform certain logic, data-processing, and data-storing functions of the secure event system 300 described herein, as well as communication functions of the secure event system 300.

In one embodiment, the data security application 350 includes encryption data 352 and secure communication channel data 354. The encryption data 352 may comprise encryption key data, and the like. The secure communication channel data 354 may include information for establishing and/or communicating across secure communication channels with computing devices associated with the one or more users.

In one embodiment, the data transmission application 360 includes user contact data 362. This user contact data 362 may include contact information for one or more users (e.g., the user 110).

The network server application 340, the data security application 350, and the data transmission application 360 are configured to invoke or use the encryption data 352, the secure communication channel data 354, the user contact data 362, and the like when communicating through the network communication interface 310 with the managing entity system 200, the computing device system(s) 400, the merchant system(s) 120, the event processing system 130, and/or the third party system(s) 140.

Figure 4:
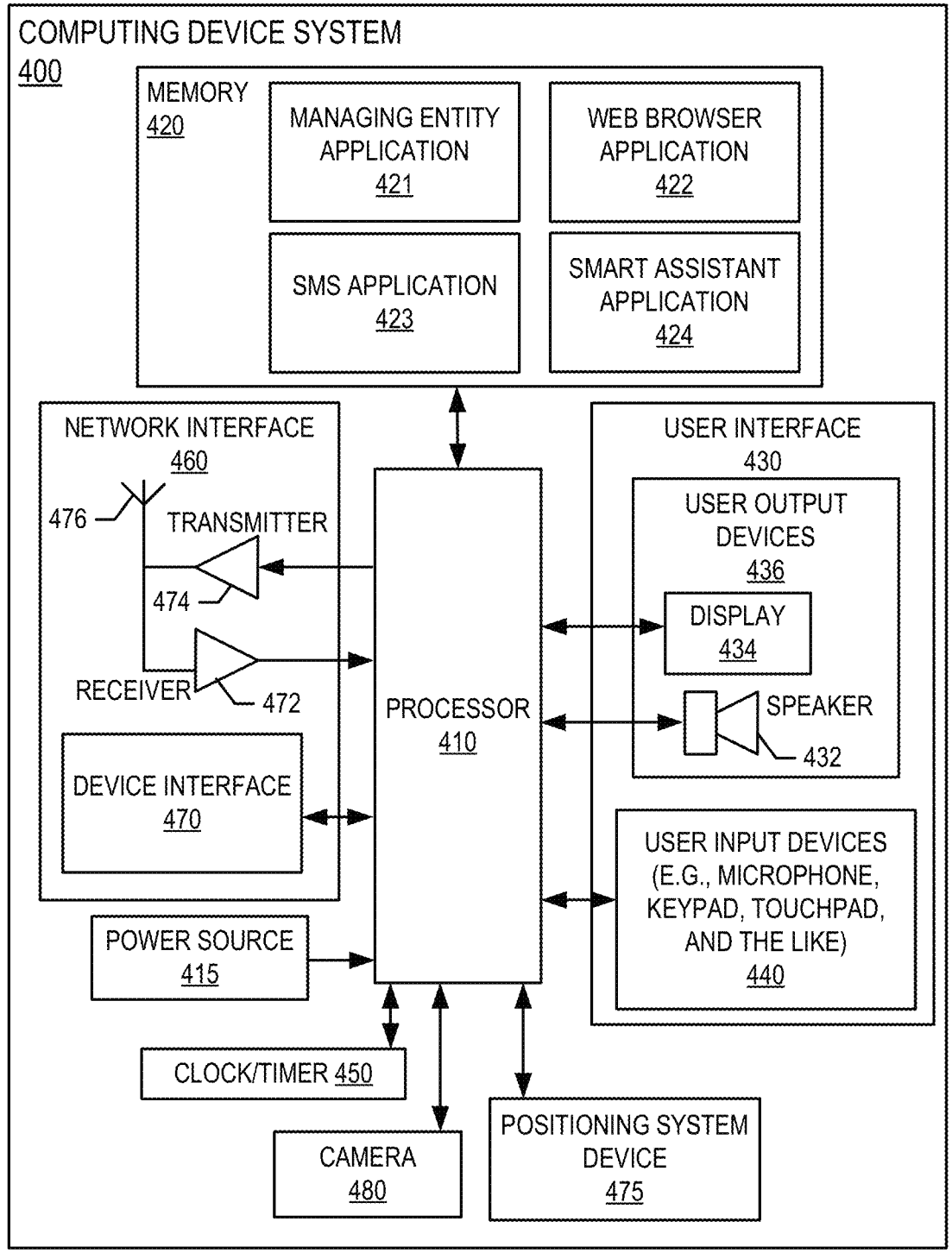
FIG. 4 provides a block diagram illustrating the computing device system(s) of FIG. 1, in accordance with an embodiment of the invention.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless telephone network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices. The positioning system device 475 may play a crucial role in transmitting location information associated with the computing device system 400 for determining when the computing device system 400 is in at or is in close proximity to a merchant system 120.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a managing entity application 421 (or any other application provided by the managing entity system 200). These applications also typically instructions to a graphical user interface (GUI) on the display 430 that allows the user 110 to interact with the computing device system 400, the managing entity system 200, and/or other devices or systems. In one embodiment of the invention, when the user 110 decides to enroll in a managing entity application 421 program, the user 110 downloads, is assigned, or otherwise obtains the managing entity application 421 from the managing entity system 200, or from a distinct application server (e.g., from the secure event system 300, a merchant system 120, or a third party system 140). In other embodiments of the invention, the user 110 interacts with the managing entity system 200 or the merchant system 120 via the web browser application 422 in addition to, or instead of, the managing entity application 421.

The memory 420 of the computing device system 400 may comprise a Short Message Service (SMS) application 424 configured to send, receive, and store data, information, communications, alerts, and the like via a wireless telephone network. In some embodiments, the memory 420 may include a multimedia messaging service (MMS) application, a Bluetooth messaging or communication application, a dedicated electronic mail application, a near-field communication application, or the like.

The managing entity application 421 may be configured to receive encrypted initial transaction data via messages, extract messages, decrypt messages, prompt the user to provide a desired payment instrument or method, identify a desired payment instrument or method, transmit transaction data including payment method to a transaction processing system, and the like.

The smart assistant application 424 may be an application provided by the managing entity system 200 (e.g., a financial institution) to a mobile computing device of a user, where the smart assistant application provides voice assistant services or the like to the user, communicates with the managing entity system 200, communicates with other computing devices like a smart assistant device 400a, communicates with the secure event system 300, communicates with an event processing system 130, and/or the third party system 140 to perform one or more of the process steps described herein.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein. For example, the memory 420 may include such data as financial institution data, financial account data, available payment method data, available payment instrument data, preferred payment data, and the like.

Figure 5:
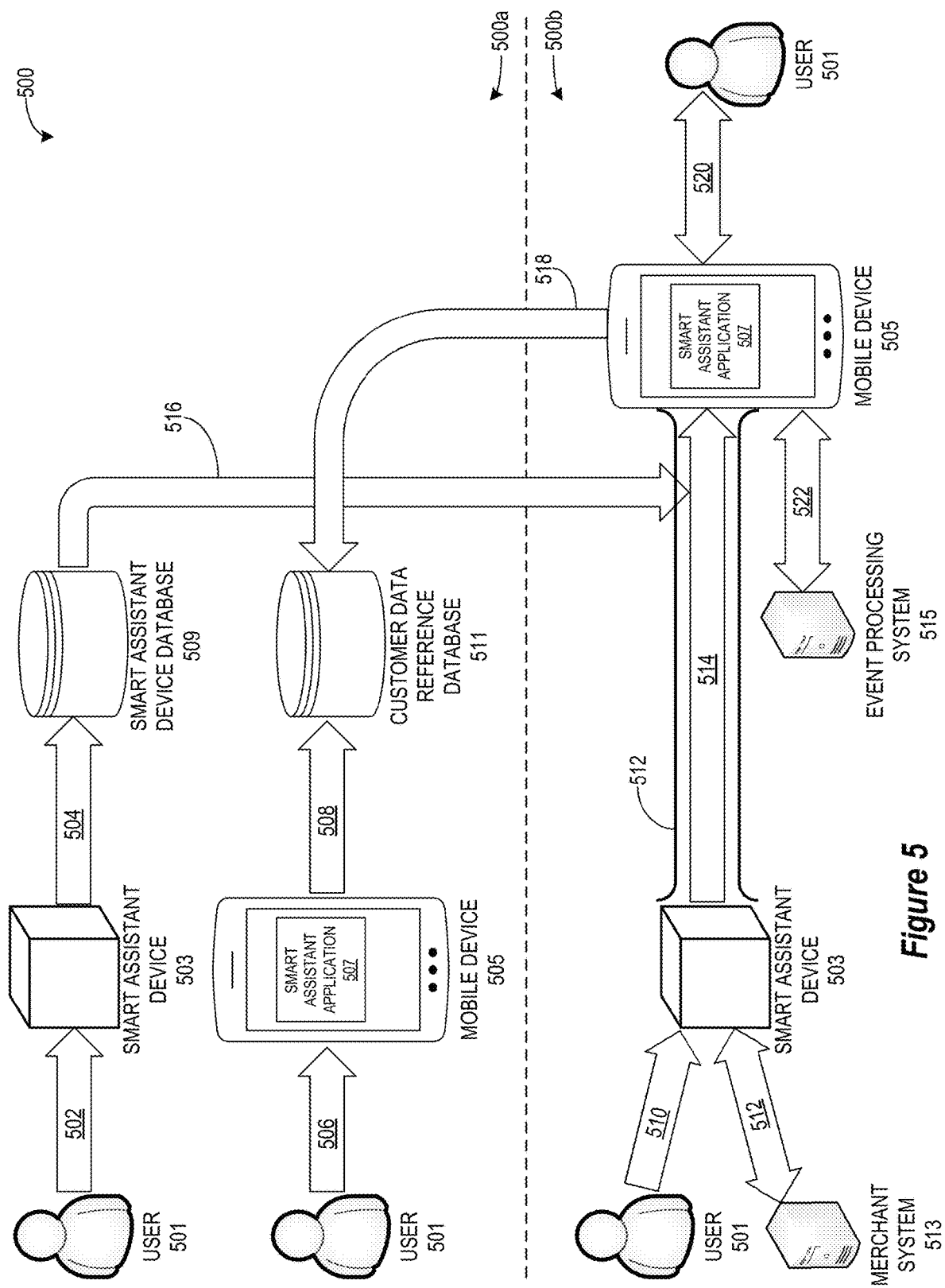
FIG. 5 provides a flowchart and diagram illustrating a process for registering and learning digital voice identification codes of a user and subsequently executing a transaction from a voiced transaction request in an asynchronous manner, in accordance with an embodiment of the invention.

In FIG. 5, a flowchart is provided to illustrate a process 500, comprising a registration and learning process 500a and a transaction process 500b. The process 500 involves at least one user 501, a smart assistant device 503, a mobile device 505 (e.g., a mobile device owned by the user 501), a smart assistant application 507 stored within or accessible through the mobile device 505, a smart assistant device database 509, a customer data reference database 511, a merchant system 513, and an event processing system 515 (e.g., the event processing system 130 of FIG. 1). In some embodiments, the smart assistant device 503 is managed by a separate entity from the smart assistant application 507 stored on the mobile device 505. As such, the smart assistant device 503 is not automatically linked to the smart assistant application 507 or its stored information, such that the two units act as separate units that can interact with each other, but do not have the same knowledge bank or resource pool. While the smart assistant application 507 is described as being stored within the mobile device 505, it should be known that the smart assistant application 507 may be an online application that is accessible on the mobile device 505 via the Internet, or can be built into a computing device (not necessarily a "mobile device") similar to the smart assistant device 503.

The process 500 may begin with the registration and learning process 500a at event 502, where the user 501 registers with a service provided by the smart assistant device 503, and provides audible messages (e.g., spoken words, vocal tones, spoken commands, spoken requests, prompted spoken words, or the like). As the smart assistant device 503 receives the audible messages from the user 501, the smart assistant device records or otherwise stores the audible messages (at least temporarily) within an internal storage medium and/or on a remote database (e.g., the smart assistant device database 509) and extracts a customer digital voice identification code (a "digital voice ID") from the voice messages. As used herein, a digital voice ID may be any hashed audio signal associated with the spoken voice of the user 501, a portion of the spoken voice of the user 501, or a combination of the two.

The user 501 may register the digital voice ID with the smart assistant device 503 by providing certain information about the user 501 (e.g., name, contact information, login information, wireless network information, or the like) along with the voiced audible messages to the smart assistant device 503, such that the smart assistant device 503 and/or an entity that manages the smart assistant device stores the information about the user 501 along with the determined digital voice ID of the user 501. The digital voice ID for each audible message received by the smart assistant device 503 is additionally stored either on an internal storage medium or on an external storage medium (e.g., a cloud server, a smart assistant device database 509, or the like).

While a single user 501 is illustrated in FIG. 1, it should be known that multiple users (e.g., customers) may be associated with the process 500, where each individual user has their own digital voice ID, which is determined based on audible messages provided by that individual user to the smart assistant device 503 (or the smart assistant application 507 of the mobile device 505). In this way, the system is configured to enable multiple users to utilize the process 500 to establish their own digital voice IDs and to subsequently execute transactions using the transaction process 500b described herein. The only other difference from what is shown in FIG. 5 is that an additional user may be associated with a separate mobile device than the user 501 (e.g., where each mobile device is personal to the separate users).

Similarly, while a single smart assistant device 503 is described with respect to this process 500, it should be known that multiple smart assistant devices 503 may be used by the one or more users 501, such that the user 501 does not have to use the same smart assistant device 503 every time the user 501 wishes to perform one or more steps of this process 500. For example, a user 501 may own multiple smart assistant devices 503, where one device is in the kitchen of the home of the user 501, one device is in a living area of the home of the user 501, and one device is in an office of the user 501, but where all devices are able to perform any of the steps described herein with respect to the smart assistant device 503.

Next, at event 504, the smart assistant device 503 may transmit and store one or more digital voice IDs for the user 501, along with additional information about the user that has been obtained by the smart assistant device 503 and/or the managing entity for the smart assistant device 503 (e.g., name information, non-voiced identification information, contact information, username information, password information, and the like) within an external smart assistant device database 509. The smart assistant device database 509 may comprise a cloud computing server or other remote database system that is configured to securely receive and store information about users (including the user 501), including digital voice IDs, registration information, smart assistant device 503 identification information, and the like. Additionally, event 504 may include the transfer and storage of additional tokens generated by the smart assistant device 503. These additional tokens may include a smart assistant device 503 identification code (e.g., a device ID or any other indicia that names or is unique to the smart assistant device 503 that interacts with the user 501).

Additionally and separately, the user 501 similarly provides voiced audible messages to a mobile device 505 associated with the user 501, where the mobile device 505 includes a smart assistant application 507 that receives the voiced audible messages from the user 501, extracts or otherwise determines one or more digital voice IDs for the user 501 from the voiced audible messages, and registers the digital voice ID of the user 501 along with additional information provided by the user 501, as represented by event 506. The smart assistant application 507 can register the digital voice ID information, and registration information (e.g., identification information, username information, password information, financial account information, and the like) of the user 501 within a customer data reference database 511 that is managed by a managing entity of the smart assistant application 507 (e.g., a managing financial institution, the managing entity system 200 of FIG. 1, and/or the like), as represented by event 508.

The managing entity of the smart assistant application 507 may then link the digital voice ID and the registration information of the user 501 to the managing entity's system. In this way, the managing entity is able to associate additional information and resources related to the user 501 with the digital voice ID of the user 501 for future reference. For example, the user 501 may already have multiple financial accounts, multiple financial payment instruments (e.g., credit cards, debit cards, stored gift cards, checking accounts, or the like), one or more usernames, one or more passwords, personal information (e.g., physical address information, contact information, mobile device 505 information (e.g., transaction device information in embodiments where the user 501 initiates and/or executes a transaction using the mobile device 505), smart assistant device 503 information (e.g., an identification of one or more smart assistant devices 503 that are associated with the user 501 (e.g., registered to the user 501, used by the user 501 in the past, or the like), and any other information that may be helpful to the managing entity in authenticating the user 501 and/or executing a transaction for the user 501.

Once the user 501 has registered its digital voice ID(s) and any other registration, personal, or financial information with the smart assistant device 503 and the smart assistant application 507, the registration and learning process 500a is robust to allow the user 501 to initiate and execute the transaction process 500b. However, it should be notes that the registration and learning process 500a can continuously update with every interaction with the user 501. For example, the smart assistant device 503 and/or the smart assistant application 507 can improve or better define the digital voice ID(s) of the user with each received voiced audible message received from the user. As a the voice of the user 501 can change over time (e.g., different intonations, different speed of speech, different pitches, and the like), the digital voice ID(s) of the user 501 will also need to be updated over time to ensure that the stored digital voice IDs of the user 501 are accurate representations of the voice of the user 501.

Turning then to the transaction process 500b of FIG. 5, the user 501 may wish to initiate a transaction for a product or service from a particular merchant, where the user 501 wishes to utilize the smart assistant device 503 in executing the desired transaction. As such, the user 501 may vocally prompt the smart assistant device 503 to initiate the transaction with a merchant system 513 associated with the merchant. For example, the user 501 may state "smart assistant device, please order product A from Merchant B using secure payment."

The smart assistant device 503, upon receiving this prompt, will interface with a merchant system 513 associated with Merchant B (e.g., via an online portal of the merchant system 513 or via a direct link between a managing entity of the smart assistant device 503 and the merchant system 513), and initiate a transaction request with the merchant system 513 for product A on behalf of the user 501, as shown at event 514. Upon receiving the transaction request from the smart assistant device 503, the merchant system 513 may transmit proposed transaction details back to the smart assistant device, as also represented by event 514.

The proposed transaction details may comprise a purchase price for product A, a product A identification code (e.g., UPC), an availability of the product A, a shipping cost of product A based on received location information (or estimated location information) for the user 501, a promotional offer associated with product A, a transaction identification code for the proposed transaction for product A, a merchant identification code for the merchant associated with the merchant system 513, account information for the merchant associated with the merchant system 513 (i.e., an account to which the purchase price for product A can or should be paid), a session identification code for the interaction between the smart assistant device 503 and the merchant system 513, and the like.

Once the smart assistant device 503 has received the proposed transaction details from the merchant system 513, the smart assistant device 503 initiates a handshake with the mobile device 505 of the user 501 (and specifically with the smart assistant application 507 of that mobile device 505) to establish a secure and dedicated communication channel 512 between the smart assistant device 503 and the mobile device 505 for the purpose of performing one or more additional steps in the transaction process 500b. This handshake may be initiated in response to the smart assistant device 503 determining that the mobile device 505 is within a particular proximity of the smart assistant device 503 (e.g., based on global positioning system ("GPS") data of the mobile device 505 and the smart assistant device 503, based on a detection using near field communication ("NFC") protocols, based on a detection using Bluetooth communication, based on a detection using a same wireless internet connection, or the like). This secure and dedicated communication channel 512 comprises an active session between the smart assistant device 503 and the smart assistant application 507 of the mobile device 505, where the smart assistant application 507 is ready to receive transaction information and/or other prompts or information from the smart assistant device 503.

Once the secure and dedicated communication channel 512 has been established, the smart assistant device 503 transmits, to the mobile device 505, the digital voice ID of the user 501 (as determined by the smart assistant device 503), an identification code or other identifying indicia for the smart assistant device 503 (e.g., an identification code that was initiated or provided to the managing entity system for the smart assistant application 507 during registration of the user 501 with the smart assistant application 507), and any other tokens or authentication information for the user 501 that has been stored in the smart assistant device database 509, as represented by event 516.

The smart assistant application 507 will then validate the digital voice ID received from the smart assistant device 503 with data stored in the customer data reference database 511 associated with the smart assistant application 507, as represented by event 518. At this point, the smart assistant application 507 can determine whether the digital voice ID received from the smart assistant device 503 matches the reference data stored in the customer data reference database 511. If there is no match, then the smart assistant application 507 can reject the proposed transaction, cause the mobile device 505 of the user 501 to display a notification that the transaction has been rejected, prompt the smart assistant device 503 to emit an audible message that the transaction has been rejected, and/or prompt the user 501 to input additional authentication credentials either via the smart assistant device 503 or the mobile device 505 of the user 501.

Alternatively, when the smart assistant application 507 determines that the received digital voice ID received from the smart assistant device 503 matches the customer voice ID(s) associated with the user 501 stored in the customer data reference database 511, the smart assistant application 507 authenticates the user 501 for the proposed transaction. The smart assistant application 507 may additionally ensure that the device ID of the smart assistant device 503 is associated with the user 501, based on the data stored in the customer data reference database 511.

In embodiments where the smart assistant application 507 is associated with multiple customers, including the user 501, the smart assistant application 507 may determine which customer has requested the transaction based on which customer digital voice ID(s) match with the digital voice ID received from the smart assistant device 503.

In response to the smart assistant application 507 authenticating the user 501 for the proposed transaction (and communicating this authentication back to the smart assistant device 503), the smart assistant device 503 transmits the transaction details (i.e., the transaction details that it received from the merchant system 513) to the smart assistant application 507 via the secure and dedicated communication channel 512 with the mobile device 505. As described above, the transaction details may include the purchase price, product A identifying information (e.g., the UPC), a transaction identification code, a session identification code, a merchant identification code, an estimated delivery schedule, a financial account number of the merchant, or the like.

Once the smart assistant device 503 has transmitted the transaction information to the smart assistant application 507, the smart assistant device 503 and/or the smart assistant application 507 can terminate the secure and dedicated communication channel 512 between the smart assistant device 503 and the smart assistant application 507, thereby permitting the smart assistant device to perform other tasks while the smart assistant application 507 processes the transaction asynchronously (as described in more detail herein).

In some embodiments, the smart assistant device 503 encrypts this transaction information prior to transmitting it to the smart assistant application 507, where the encryption is based on at least one of the smart assistant device 503 identification code, the digital voice ID of the user 501, or a predetermined encryption key that has been shared with the smart assistant application 507 and/or a managing entity for the smart assistant application. In such embodiments, the smart assistant application 507 will decrypt the encrypted transaction information upon receiving the encrypted transaction information.

Once the smart assistant application 507 has received the transaction information, the smart assistant application 507 processes the required payment information for the transaction (e.g., amount to be paid, accepted payment methods, and the like). The smart assistant application 507 may then proceed to event 520 to initiate a conversation with the user 501 by causing a display of the mobile device 505 to present a notification that the user is authenticated for the transaction and to prompt the user 501 to select a financial account and/or financial instrument for performing the payment to the merchant system 513 of Merchant B for the product A.

Event 520 continues with the user 501 selecting the financial account and/or financial instrument for the transaction via a user input mechanism of the mobile device 505, thereby instructing the smart assistant application 507 to carry out the transaction with the merchant.

In some embodiments, the smart assistant application 507 will then execute the transaction via an event processing system 515 associated with the managing entity of the smart assistant application 507, where the event processing system 515 executes the transaction by transferring the transaction amount from the user 501 (via the selected financial account and/or financial transaction instrument of the user 501) to the identified merchant financial account. Once the transaction has been executed, the event processing system 515 will notify the smart assistant application 507, which in turn transmits notifications of the completed transaction to the smart assistant device 503, the display of the mobile device 505, and/or the merchant system 513. These notification may include, but are not limited to, the purchased product(s) (i.e., product A in this example), the product identification code, the transaction identification code, the merchant name, the merchant identification code, the session identification code, the delivery (or estimated delivery) information, promotional offers associated with the merchant and/or the product(s) purchased, rewards points associated with the transaction, the selected and utilized financial account and/or financial transaction instrument of the user 501, a return policy of the merchant, and the like.

This process 500 enables the user 501 to execute a transaction via the smart assistant device without compromising the security of the user's personal or financial information, and in a manner that reduces the friction of a smart assistant device transaction and payment process. In particular, the only spoken information (and therefore the only information that could be overheard) is the name of the product and the name of the merchant. All sensitive information associated with the transaction is identified or received via secure communication channels (e.g., the secure and dedicated communication channel 512) and on the mobile device 505 associated with the user 501. In this way, the user 501 maintains full control over their personal and financial information, where even the merchant system 513 does not need to receive any information about the user except for the account information that is necessary for executing the transaction. Furthermore, because the transaction is executed asynchronously, and as described in more detail herein, the user 501 does not need to speak or provide any potentially sensitive information about the user and its financial account(s) or financial transaction instruments (e.g., card numbers, expiration dates, security questions, passwords, and the like) with the merchant system 513 or the smart assistant device 503, which significantly reduces the number of touch points where the sensitive information of the user 501 may be compromised.

Figure 6:
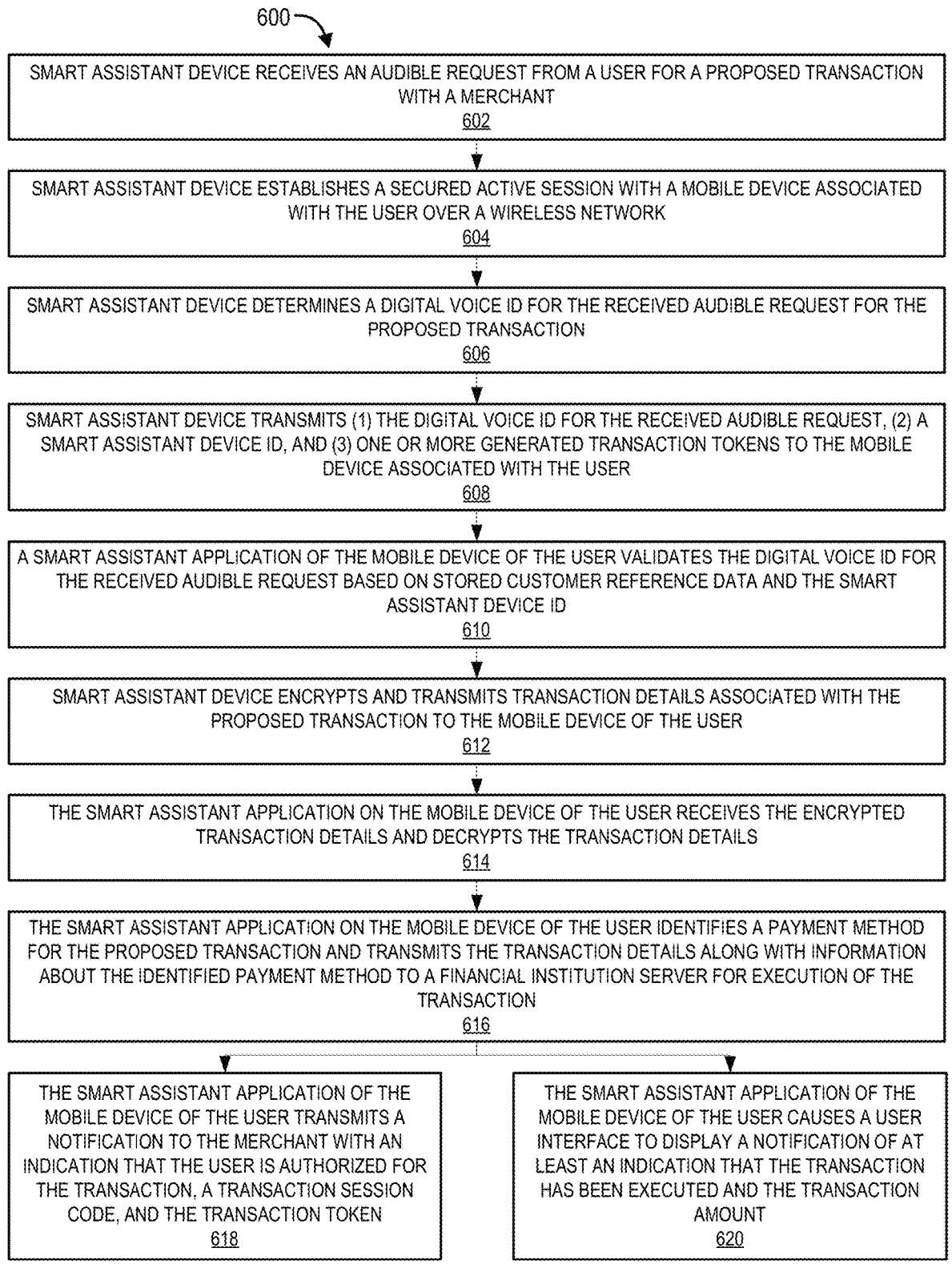
FIG. 6 provides a flowchart illustrating a process for employing a smart device for secure and authenticated event execution, in accordance with an embodiment of the invention.

Referring to FIG. 6, a flowchart is provided to illustrate a process 600 for employing a smart device for secure and authenticated event, where financial data of the user is not provided to the merchant or a third party. In some embodiments, the process 600 may include block 602, where a smart assistant device receives an audible request from a user for a proposed transaction with a merchant. In some embodiments, the process 600 includes step 604, where the smart assistant device establishes a secured active session with a mobile device associated with the user over a wireless network. Additionally, in some embodiments, the process 600 includes block 606, where the smart assistant device determines a digital voice identification code (or "ID") for the received audible request for the proposed transaction.

The process 600 may also include block 608, where the smart assistant device transmits (1) the digital voice ID for the received audible request, (2) a smart assistant device ID, and (3) one or more generated transaction tokens to the mobile device associated with the user. In some embodiments, the process 600 includes block 610, where a smart assistant application of the mobile device of the user validates the digital voice ID for the received audible request based on stored customer reference data and the smart assistant device ID. Additionally, in some embodiments, the process 600 includes block 612, where the smart assistant device encrypts and transmits transaction details associated with the proposed transaction to the mobile device of the user. In some embodiments, the process 600 may include block 614, where the smart assistant application on the mobile device of the user receives the encrypted transaction details and decrypts the transaction details.

Furthermore, the process 600 may include block 616, where the smart assistant application on the mobile device of the user identifies a payment method for the proposed transaction and transmits the transaction details along with information about the identified payment method to a financial institution server for execution of the transaction. Next, the process 600 may proceed to block 618, where the smart assistant application of the mobile device of the user transmits a notification to the merchant with an indication that the user is authorized for the transaction, a transaction session code, and the transaction token. Finally, in some embodiments, the process 600 may include block 620, where the smart assistant application of the mobile device of the user causes a user interface to display a notification of at least an indication that the transaction has been executed and the transaction amount.

Figure 7:
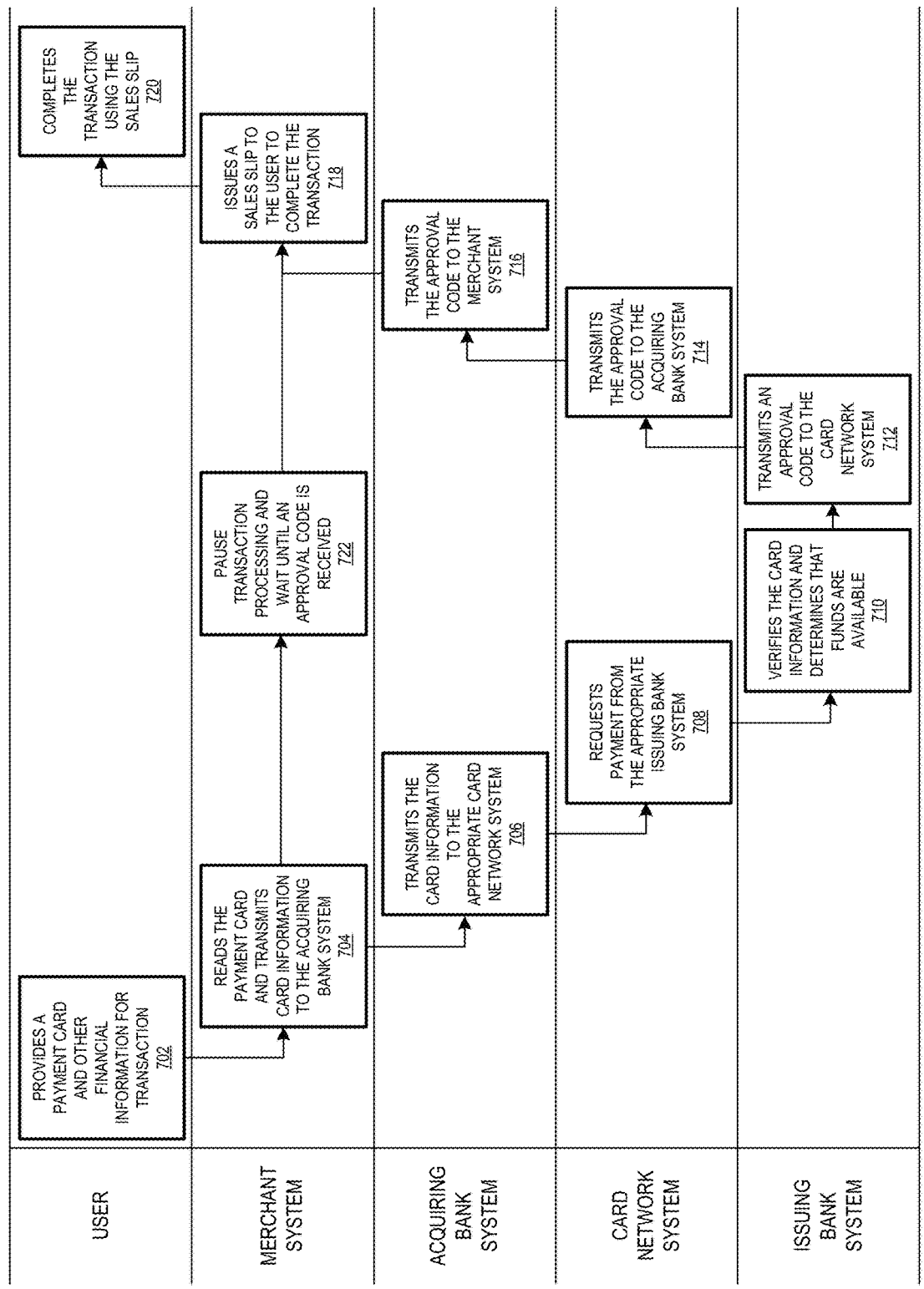
FIG. 7 provides a block diagram illustrating a conventional system for the transfer of user financial information and the execution of a transaction based on the user financial information, in accordance with an embodiment of the invention.

Referring now to FIG. 7, a flowchart is provided as background to illustrate conventional steps for processing a payment transaction between a user and a merchant system. To initiate the transaction with the merchant, the user provides a payment card for the transaction to the merchant system, as shown in block 702. The user may also be prompted to provide, and subsequently provide, additional information associated with the payment card (or another financial instrument) that may enable the transaction to successfully process (e.g., a personal identification number, a zip code, an answer to a security question, or the like). The merchant system then reads the payment card to obtain the financial information of the user and transmits the card information to the acquiring bank system, as noted in block 704.

Block 706 illustrates that the acquiring bank system then transmits the card information to the appropriate card network system that is associated with the payment card of the user. The card network system requests payment from the appropriate issuing bank system that is associated with the user's account, as shown in block 708.

The issuing bank system then verifies the card information and determines that the funds are available in block 710. Next, the issuing bank system proceeds to block 712 and transmits an approval code to the card network system.

The card network system, as shown in block 714, then transmits the approval code up to the acquiring bank system, and the acquiring bank system, as shown in block 716, transmits the approval code to the merchant system. The merchant system then issues a sales slip to the user to complete the transaction as shown in block 718. Of note, once the merchant system transmits the card information to the acquiring bank system in block 704, the merchant system will pause its transaction process and wait for a response of the approval code before continuing the transaction with the user and subsequent transactions with other users, as shown in block 722. Finally, the user completes the transaction with the merchant by using the sales slip, as shown in block 720.

This conventional transaction execution process 700 requires that the merchant system pause its processing operations for the amount of time between its request for an approval of the requested transaction to when the approval is received. As such, the merchant system is slowed down and generally lacks efficiency because its processing devices cannot continuously execute operations (e.g., additional transactions, transactions with third parties, merchant-side operations like providing features for a web portal, and the like). If the merchant system was not required to pause its processing operations until the approval code is received, then the merchant system could utilize its computing resources in a more beneficial and efficient manner.

Figure 8:
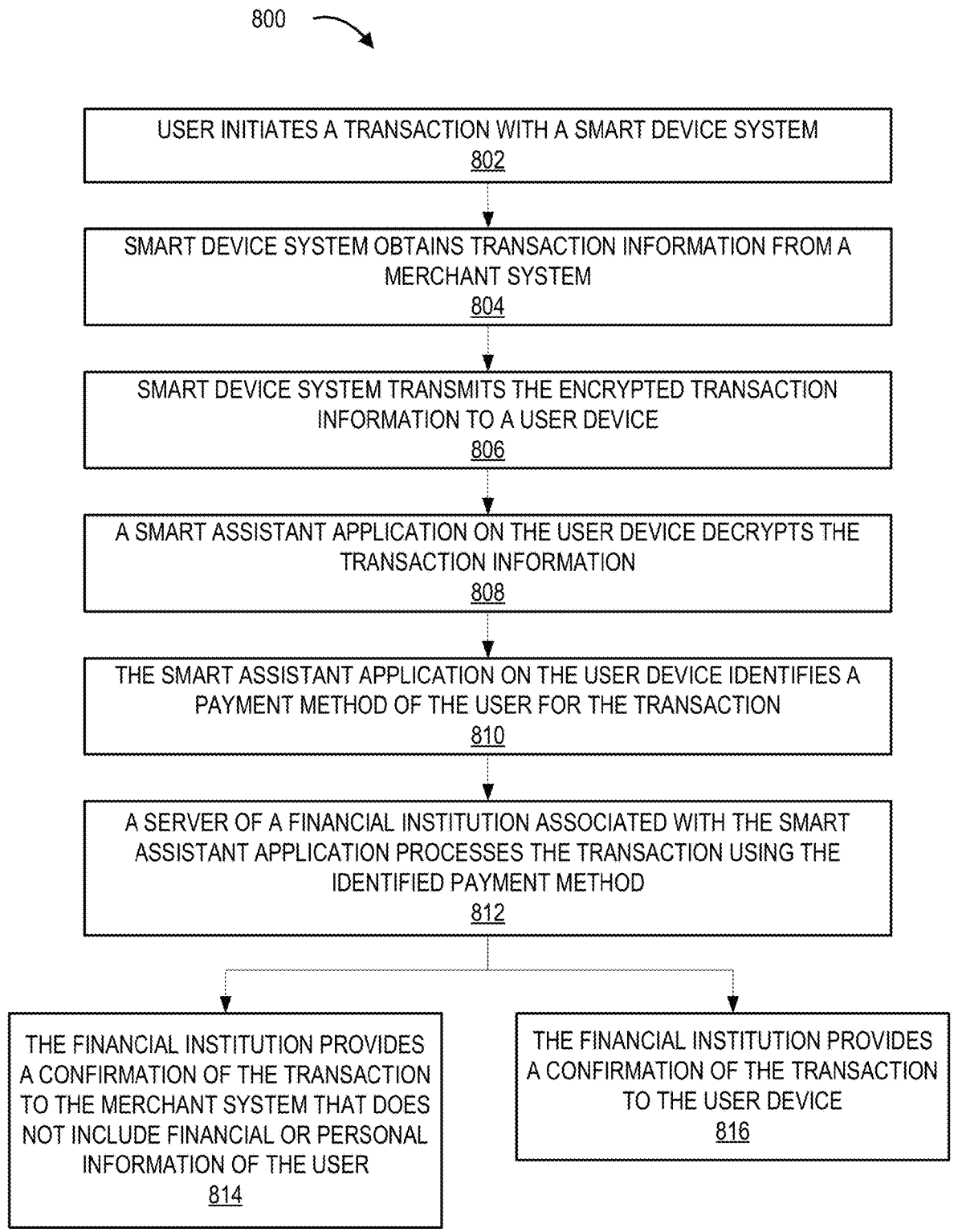
FIG. 8 provides a flowchart illustrating a process for executing a transaction without the transfer of user financial information to the merchant or to a third party, in accordance with embodiments of the invention.

Referring now to FIG. 8, a flowchart is provided to illustrate one embodiment of a process 800 for the execution of a transaction using a smart device (e.g., a smart assistant device), including the secure transfer of encrypted financial and transaction information and asynchronous execution of the transaction, in accordance with embodiments of the invention. In some embodiments, the process 800 may include block 802, where the user initiates a transaction with a smart device system. This initiated transaction may be the same or substantially similar to event 510 of FIG. 5. As noted above, the user may be a customer of a managing entity system, a financial institution system (e.g., an issuing bank system), a card network system, or the like. The user may have registered with the smart device system, such that a the smart device system has information about the user already stored on its internal or remote memory devices, including at least one known digital voice ID for the user. This initiated transaction may comprise a voiced, audible message or prompt from the user that is received (and possibly recorded) by a microphone of the smart device. The initiated transaction may name a merchant (e.g., an exact merchant, a pre-programmed merchant, or the like), and may name a product or service that the named merchant provides that the user would like to purchase.

Once the smart device system receives the initiated transaction request, the process 800 proceeds to block 804, where the smart device system interfaces with a merchant system associated with the merchant of the requested transaction and obtains transaction information from the merchant system. The merchant system may generate a set of transaction information including, but not limited to, information about the goods or services, the payment amount, timing of the transaction, merchant account information (e.g., a financial account to which the payment amount will be submitted), and the like.

Importantly, this transaction information does not include any financial information of the user. The user is not providing a payment vehicle (e.g., a credit card, debit card, check, or the like) that includes information that could be misappropriated to the detriment of the user. Additionally, the user is not providing any biometric information (e.g., fingerprint, retinal scan, or the like), password or passcode information, answers to security questions, customer numbers, or the like. This additional personal information of the user could also be misappropriated to the detriment of the user, especially when identified along with any financial information of the user.

The only personal information of the user that may be provided is contact information of the user, which may include a telephone number of the user, an email address of the user, a near-field communication link authorization of the user, or the like. This user contact information, if misappropriated would not be as detrimental to the user as the other personal information or financial information of the user, as the information may already be publicly available, can be changed at any time, and does not permit malfeasants to gain access to financial accounts, financial instruments, or the like.

Next, as shown in block 806, the smart device system transmits encrypted transaction information to a user device.

While process 800 illustrates how the smart device system may transmit the encrypted information to the user device, it should be known that a managing entity system (e.g., a financial institution system that is associated with the user and/or the smart device) may encrypt and/or transmit the encrypted information to the user device. By encrypting the transaction information, the system further protects any information that the user, the merchant system, and/or the smart device system would prefer to keep secure.

The encrypted transaction may be transferred as a message to the user device. For example, the message may be sent as an SMS message, an MMS message, an electronic mail message, a near field communication message (e.g., via an NFC chip associated with the merchant system and/or the user device, via an RFID connection, a Bluetooth connection, a Wi-Fi connection, or the like). A smart assistant software application provided by, managed by, or otherwise associated with a financial institution associated with the user (i.e., a financial institution application) may be stored on the user device, and the transmission of the encrypted transaction information via the message may trigger the application to identify the occurrence of a new transaction request and execute certain steps. In some embodiments, a handshake between the smart device system and the user device may be established to construct a secure and dedicated communication channel (e.g., via Bluetooth, via a wireless Internet connection, via an NFC connection, or the like) between the smart device system and the user device (and the smart assistant application of the user device in particular).

As shown at block 808, the smart assistant application stored on the user device then decrypts the transaction information. By decrypting the transaction information, the smart assistant application is able to identify the transaction information, including the purchase price, the goods or services being purchased, timing information regarding the transaction, an account of the merchant to which a payment should be made, and/or the like. The only information that is missing to initiate steps for transaction processing is which payment instrument and/or payment method the user will use for this transaction.

Therefore, the process 800 may include block 810, where the smart assistant application on the user device identifies a payment method of the user for the transaction. Because the user did not provide a payment method or instrument when initiating the transaction with the merchant system, the smart assistant application on the user device must rely on its internal memory to identify a preferred financial instrument or payment method of the user, to list available payment methods of the user, or to request user input of a payment method from the user (e.g., via a user interface of the user device). In the latter embodiment, the smart assistant application may already have access to a list of approved financial accounts and/or financial instruments that the user has with the financial institution. The fact that the smart assistant application has this financial information is not an issue for the user, as the financial accounts and financial instruments are managed by that financial institution, so the information would already be known by them. No new parties would be receiving the financial information of the user through this process. Ultimately, the smart assistant application on the user device identifies, and/or the user selects, a payment method for the transaction.

At this point in the process 800, the financial institution associated with the smart assistant application (and the user) has all information needed to execute the transaction: the transaction amount, the financial account of the merchant system that should be paid, and the payment method of the user that will be used to conduct the transaction. Of course other transaction information, including a transaction number or code, timing information of the transaction, identification information of the merchant and/or the goods or services being transacted, and the like, may be known to the financial institution at this point in time, and could be used to execute the transaction.

Moving to block 812, a server of the financial institution then processes the transaction using the identified payment method. Of note, since the merchant server transmitted the initial transaction information to the smart device system(or to the merchant system, to send to the smart device system), the merchant server has not been required to pause its operations, to wait for an approval code, or any other requirement that reduces the efficiency of its processing devices. Instead, it has been free to execute other transactions, to transmit other initial transaction information to other user devices, and the like. This process 800 does not need any other executions from the merchant system to execute the transaction, and therefore the transaction is executed securely by the financial institution's transaction processing system.

Likewise, once the smart device system has transferred the encrypted transaction information to the smart assistant application of the user device, the processing power and obligations of the smart device system is no longer needed and the smart device system can return to its ordinary operations (e.g., answering questions, setting and managing alarms or alerts, playing music, or the like).

Once the transaction has been processed or otherwise executed, the financial institution then provides a confirmation of the transaction to the merchant system that does not include financial or personal information of the user, as shown in block 814. As this process 800 has not required the dissemination of financial information regarding the user (or the financial accounts associated with the user), or the personal information of the user (including passcode information, biometric information, and the like, with the exception of the user contact information), the process 800 continues to protect the financial and personal information of the user by not providing it to the merchant system, even after the transaction is processed. Instead, the system may provide a transaction code to the merchant system that references the transaction on the financial institution's system. This way, if the merchant has a question or issue with the transaction, the merchant can provide this transaction reference code to the financial institution, and the financial institution can review the additional transaction details that include the financial information of the user.

Generally, the confirmation of the transaction will include information about the transaction amount, the goods or services exchanged, the timing of the transaction, a transaction number associated with the merchant's records, and the session code or other transaction reference code of the financial institution. Again, the merchant system has not been required to wait for this transaction to be approved before moving forward with other operations by its processing devices.

Additionally, once the transaction has been processed or otherwise executed, the financial institution provides a confirmation of the transaction to the user device, as shown in block 816. Similarly to the merchant confirmation, the user confirmation may include the basic transaction information, but may also include information about the payment method used, and any other useful information like a remaining balance for that payment method, coupons or discounts that the user could use in the future, based on this transaction, and the like. In the same manner, the financial institution (or the smart assistant application of the user device, as a function of the financial institution) may cause the smart device system to provide an indication that the transaction has been executed (e.g., an audible message, an audible signal that symbolizes a successful transaction, or the like).

Figure 9:
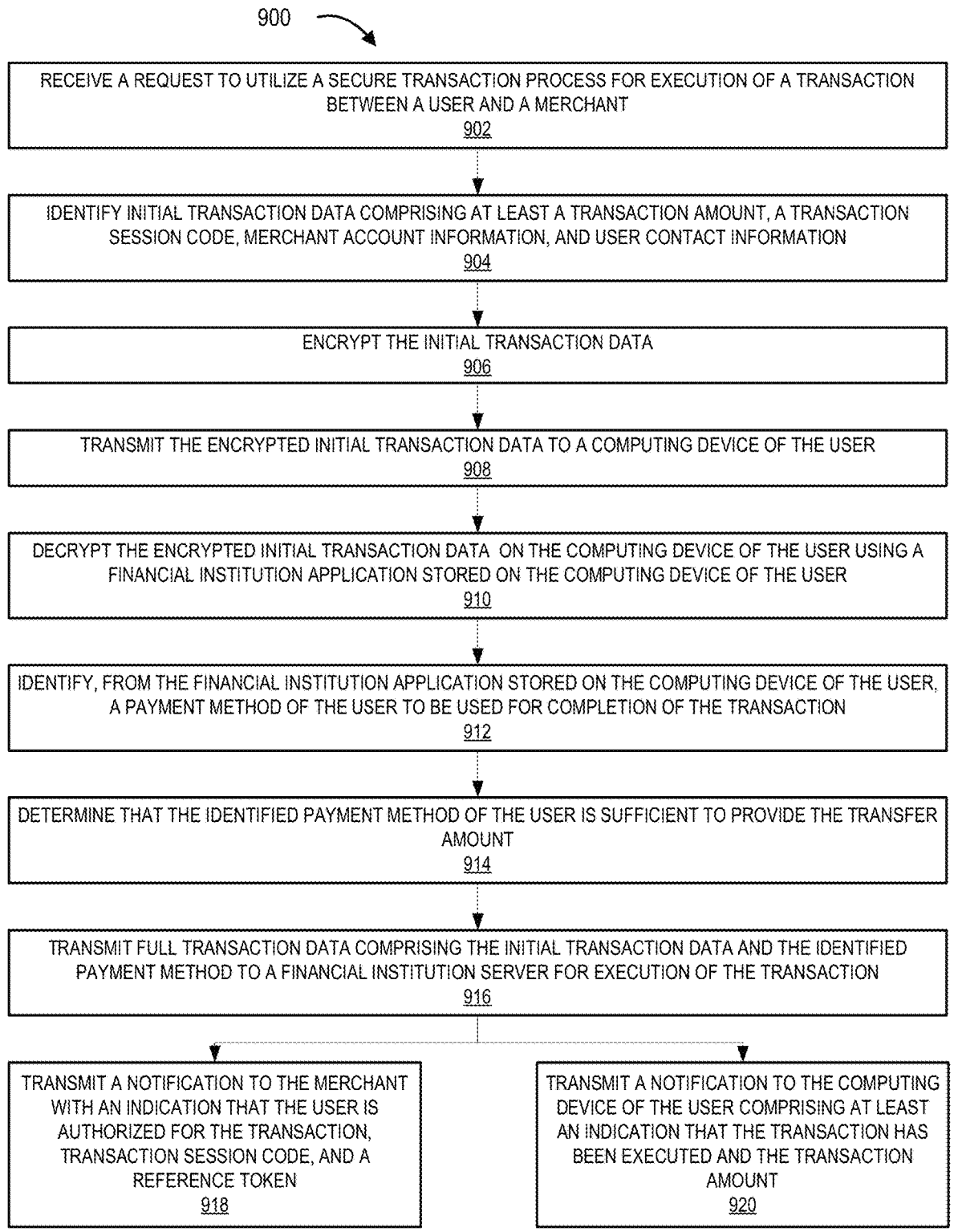
FIG. 9 provides a flowchart illustrating a more detailed process for executing a transaction without the transfer of user financial information to the merchant or to a third party, in accordance with embodiments of the invention.

Referring now to FIG. 9, a flowchart is provided to illustrate one particular embodiment of a process 900 for the secure transfer of encrypted transaction information and asynchronous transaction execution, in accordance with embodiments of the invention. In some embodiments, this process 900 (or variations of this process 900) may be performed by a managing entity system (e.g., the managing entity system 200 of FIG. 1), a secure event system or other secure transaction system (e.g., the secure event system 300 of FIG. 1), one or more computing devices (e.g., the smart assistant device 400*a* and/or the mobile device 400*b* of FIG. 1), one or more merchant systems (e.g., the online portal system 120*a* and/or the point of sale device 120*b* of FIG. 1), an event processing system or other transaction processing system (e.g., the event processing system 130 of FIG. 1), and/or one or more third party systems (e.g., the third party system(s) 140 of FIG. 1).

The process 900 may begin with block 902, where the system receives a request to utilize a secure transaction process for execution of a transaction between a user and a merchant. This request may be received from a computing device associated with the transaction. This computing device that is associated with the transaction may be a computing device of the user (e.g., a smart assistant device, a mobile phone, personal computer, laptop computer, or the like) or a computing device of a merchant system (e.g., a smart assistant device, a point of sale device, an electronic kiosk device, an automated teller machine, or the like).

In embodiments where the user is initiating a transaction using a computing device of the user, via an online portal of the merchant, the system may determine that the user is initiating the transaction and cause the online portal associated with the merchant to present a selectable icon that, when selected by the user, initiates the request to utilize the secure transaction process for the execution of the transaction.

In embodiments where the user is initiating the transaction at a computing device of the merchant (e.g., a point of sale device), the system may cause the point of sale device to display a selectable icon or button that the user may select to request the use of the secure transaction with the merchant.

In some embodiments, the process 900 includes block 904, where the system identifies initial transaction data comprising at least a transaction amount, a transaction session code, merchant account information, and user contact information. As the user is entering into a transaction with the merchant for goods and/or services, the initial transaction data may contain at least the information that is required for the transaction: transaction amount, merchant identification code (or an account number that should receive a transaction payment from the user, and timing of the transaction. Of course, other transaction information may be included in the initial transaction data including, but not limited to, identifying information for the goods and/or services that are being purchased by the user, tax information, shipping information, discount information, merchant-generated transaction identifier data, geographic information about the merchant, other information about the merchant that may be useful in recording the transaction, and the like.

Importantly, and as described above, the initial transaction data does not include any financial information associated with the user including financial instrument information (e.g., credit card information, debit card information, financial account information, and the like), security information associated with the user (e.g., user passcode information, personal identification number information of the user, biometric information of the user, or the like). This process 900 does not require that the user provide any of this information to any entity or system other than the financial institution with which the payment instruments or methods of the user are managed, or with which the user already has provided the security information associated with the financial information.

By not requiring the user to provide financial information, this process 900 protects the sensitive data from misappropriation by the merchant system and/or third parties that intervene or attempt to intercept the financial information. Additionally, personal identification numbers, biometric information, passcode information, and other information that would otherwise aide malfeasants in obtaining access to the financial information of the user are not revealed as part of this type of transaction. Therefore, this process 900 is an improvement upon conventional methods of executing transactions that normally require the transfer of financial and security information to at least the merchant system, which opens the financial and security information up to misappropriation.

In online portal embodiments, the system may identify the device accessing the online portal (i.e., the user device), and identity known contact information for that device and/or the user associated with the device.

In some embodiments, the system may prompt the user to provide the contact information (e.g., phone number, email address, or the like) via the online portal, via the computing device of the merchant, or the like. The user may alternatively be prompted to transmit an initial message to a computing device associated with the merchant system (e.g., transmit a text message to the merchant system with a confirmation code generated to be associated with the transaction), or the like. In this way, the user may be able to avoid providing any personal information or financial information to the merchant system, because the contact information of the user would be transmitted directly to a managing entity system (e.g., the system associated with the financial institution entity). This transmission of user contact information (or just a message from a contact number or address) from the user device may include a session code, transaction code, or other identification code that allows the managing entity system to identify which transaction the user is associated with, and therefore which initial transaction data (received from the merchant system) to associate with the user.

In some embodiments, identifying the transaction data comprises receiving a transmission of the initial transaction data in a form of an asynchronous command from a merchant server associated with the merchant. As noted above with respect to FIG. 7, conventional transaction processes involve the merchant server receiving the financial information of the user, sending the financial information of the user and the transaction information to one or more third parties, and pausing its processing operations until an approval code is received (i.e., a "synchronous" command). During this pause in processing operations, the merchant server is not performing any useful operations and therefore reduces the efficiency of the processing environment for the merchant server. Because this process 900 does not require that the merchant server waste its time and resources by waiting for approval codes, the merchant server is able to transmit the initial transaction data to a server associated with a managing entity system and immediately move on to perform the next operation in its queue (i.e., an "asynchronous" command). Of course, in some embodiments, the merchant system transmits the initial transaction data to the computing device of the user instead of to the managing entity system (e.g., at block 908), but the same concept applies: the merchant system is able to transmit the data in an asynchronous manner such that it can continue operations without pausing operations until an approval code is received.

Additionally, in some embodiments, the process 900 includes block 906, where the system encrypts the initial transaction data. By encrypting the initial transaction data, the system is further protecting any financial, personal, transaction, and other information of the user and/or the merchant. In embodiments where the merchant system has transmitted the initial transaction data to a managing entity system (e.g., the managing financial institution system), the managing entity system performs the The process 900 may also include block 908, where the system transmits the encrypted initial transaction data to a computing device of the user. This transmission is made based on the provided or identified contact information of the user (e.g., a phone number, an electronic mail address, a Bluetooth connection, or the like). In some embodiment, the system causes the merchant system to transmit the encrypted initial transaction data to the computing device of the user. In other embodiments, the initial transaction data has already been transmitted to the managing entity associated with this system in process 900, and therefore the managing entity system is configured to transmit the initial transaction data directly to the computing device of the user.

The system may transmit (or cause another system to transmit) the encrypted initial transaction data to the computing device of the user in several ways. One example technique is to transmit an electronic mail message comprising the encrypted initial transaction data to an electronic mail address associated with the user and the computing device of the user. In another example, the system may transmit a short message service message comprising the encrypted initial transaction data to a short message service number associated with the user and the computing device of the user. Furthermore, the system may transmit a multimedia messaging service message comprising the encrypted initial transaction data to a multimedia messaging service number associated with the user and the computing device of the user. The system may also cause the merchant system to transmit a near field communication message comprising the encrypted initial transaction data from a point of sale device (or other merchant device) to the computing device of the user. Of course, the system may utilize other techniques for transmitting the encrypted initial transaction data to the computing device of the user (e.g., by storing the initial transaction data in a server that is accessible by a managing entity application or financial institution application stored on the computing device of the user, and transmitting a notification to the computing device of the user to retrieve the initial transaction data form the server).

In some embodiments, the process 900 includes block 910, where the system decrypts the encrypted initial transaction data on the computing device of the user using a financial institution application stored on the computing device of the user. The information or keys for encryption and/or decryption information may be stored within the financial institution application stored on the computing device of the user. Therefore, when the encrypted initial transaction data is received, financial institution application extracts the encrypted initial transaction data and decrypts the data using a stored or known key. For example, the financial institution application may determine that encrypted initial transaction data has been received via an SMS message (e.g., by identifying a triggering code in the received message), extract the encrypted initial transaction data from the SMS message, and use a known key to decrypt the initial transaction data. The initial transaction data is then readable by the financial institution application.

Additionally, in some embodiments, the process 900 includes block 912, where the system identifies, from the financial institution application stored on the computing device of the user, a payment method of the user to be used for completion of the transaction. The payment method may be any financial instrument, financial account, payment method, or the like that a user can utilize to pay for a product or service of the merchant to complete the transaction. Examples of payment methods include, but are not limited to, credit cards, debit cards, bank accounts, instant short term loans, checks, and wire transfer.

In some embodiments, the step of identifying the payment method comprises identifying a plurality of available payment methods associated with the user (e.g., as stored within the financial institution application stored on the computing device of the user and/or by searching for financial accounts associated with the user, as stored within an internal database of the financial institution. The system may then prompt the computing device of the user to display selectable icons associated with each of the plurality of available payment methods associated with the user and to request a user input of desired payment methods associated with the user and to request a user input of a desired payment method of the plurality of payment methods. Next, the system may receive the user input of the desired payment method in a form of a selection of a selectable icon of the displayed selectable icons. The system may then assign the desired payment method as the identified payment method of the user to be used for completion of the transaction.

In other embodiments, the user may select or enter a desired payment method or payment instrument ahead of time. In such embodiments, the payment method is predetermined and the financial institution application does not need to be prompted to request the payment method, as the predetermined payment method is automatically selected.

Because the transaction technique described in this process 900 does not necessarily need to be executed within a very short period of time, additional payment vehicles or methods can be utilized by the user to execute the transaction. As such, in one embodiment, the system may notify the user, via the computing device of the user, that the user is pre-authorized to utilize a short term loan for at least the transaction amount. If accepted, the financial institution entity associated with the financial institution system would then provide the payment amount to the merchant system and set up the short term loan provisions with the user.

The process 900 may include block 914, where the system determines that the identified payment method of the user is to provide the transfer amount. The system may also perform one or more other authentication, authorization, or verification steps with the user and/or the computing device associated with the user to ensure that the user has authorized the payment, that the payment method or payment instrument is adequately prepared to cover the transaction amount, and the like. In some embodiments, the system may require that the user provide log-in credentials, biometric information, or the like to permit the financial institution application stored on the computing device of the user to perform one or more of the steps of this process 900.

With the payment method and/or payment instrument identified, the system is prepared to execute the transaction between the user and the merchant. Therefore the process 900 may include block 916, where the system transmits full transaction data comprising the initial transaction data and the identified payment method to a financial institution server (e.g., the event processing system 130 of FIG. 1) for execution of the transaction. In some embodiments, the system may encrypt the transaction information and transmit the encrypted transaction information to the financial institution server or other transaction execution system.

Once again, no third party systems have received the financial or personal information of the user, as the transaction is being processed within the financial institution system that already has access to all financial and personal information that is included in the transaction information for the processing of the transaction.

Once the transaction data has been authorized and transmitted to the financial institution server for execution of the transaction, the system may proceed to block 918, where the system transmits a notification to the merchant with indications that the user is authorized for the transaction, a transaction session code, and a transaction reference token. Of course, other information may be provided to the merchant system including, but not limited to, transaction reference codes (either generated by the merchant system or the financial institution system), time-based information (e.g., a transaction initiation timestamp, a transaction execution timestamp, or the like). Again, no financial or personal data of the user is being provided to the merchant or any third party through this process 900.

Finally, the process 900 may continue to block 920, where the system may transmit a notification to the computing device of the user comprising at least an indication that the transaction has been executed and an indication of the transaction amount. Of course, other information may be provided to the computing device of the user including, but not limited to, transaction reference codes, transaction time-based information, offers or coupons for future transactions with the merchant, and the like.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for employing a smart device for secure event execution, the system comprising:
   a smart assistant application module comprising:
      a memory device; and
      a processing device operatively coupled to the memory device, wherein the processing device is configured to execute computer-readable program code to:
         receive, via a microphone, a spoken audible request from a user for a transaction with a merchant
         upon receiving the audible request, determine a digital voice identification code associated with the audible transaction request, wherein the digital voice identification code is determined based on the audible request;
         receive, from a smart assistant device, the digital voice identification code, a smart assistant device identification code, and one or more transaction tokens;
         validate the digital voice identification code associated with the audible transaction request as being associated with the user and establish a secured active session between a mobile device associated with the user over a wireless network to complete the transaction with the merchant;
         receive, from the smart assistant device, encrypted transaction details associated with the audible transaction request;
         decrypt the encrypted transaction details associated with the audible transaction request, wherein decrypting the encrypted transaction details is conducted based on a smart device identification code or a predetermined encryption key;
determine a financial instrument of the user for executing the audible transaction request; and
transmit the transaction details and information about the determined financial instrument of the user for executing the audible transaction request to a financial institution server for execution of a transaction associated with the audible transaction request with the merchant via a separate channel.

2. The system of claim 1, wherein the system further comprises a smart assistant device module comprising:
a memory device; and
a processing device operatively coupled to the memory device, wherein the processing device is configured to execute computer-readable program code to:
receive the audible transaction request from the user;
obtain transaction details associated with the audible transaction request from a merchant system;
establish a secured active session with a computing device of the user over a wireless network;
determine a digital voice ID for the received audible transaction request;
transmit (1) the digital voice ID for the received audible transaction request, (2) a smart assistant device ID, and (3) one or more generated transaction tokens to the computing device of the user; and
encrypt and transmit the transaction details associated with the audible transaction request to the computing device of the user.

3. The system of claim 1, wherein validating the digital voice identification code associated with the audible transaction request as being associated with the user is based on stored customer reference data and a smart assistant device identification code associated with the smart assistant device.

4. The system of claim 1, wherein:
determining the financial instrument of the user for executing the audible transaction requests comprises prompting a computing device of the use to display selectable icons that are each associated with one or more financial instruments of the user; and
receiving an indication from the computing device of the user that the user selected the financial instrument of the user for executing the audible transaction request.

5. The system of claim 1, wherein:
determining the financial instrument of the user for executing the audible transaction request comprises identifying a predetermined preferred financial instrument of the user; and
determining that the predetermined preferred financial instrument of the user is an acceptable transaction mechanism based on the transaction details associated with the audible transaction request.

6. The system of claim 1, wherein the processing device is further configured to execute computer-readable program code to:
in response to transmitting the transaction details and the information about the determined financial instrument of the user for executing the audible transaction request to a financial institution server, transmit a notification to a merchant system with (1) an indication that the user is authorized for the transaction, (2) a transaction session code, (3) and a transaction identification token.

7. The system of claim 1, wherein the processing device is further configured to execute computer-readable program code to:

in response to transmitting the transaction details and the information about the determined financial instrument of the user for executing the audible transaction request to a financial institution server, cause a user interface of a user computing device to display a notification of at least an indication that the transaction has been executed and an amount of the transaction.

8. A computer program product for employing a smart device for secure event execution, the computer program product comprising at least one non-transitory computer readable medium comprising computer readable instructions, the instructions comprising instructions for:
receiving, via a microphone, a spoken audible request from a user for a transaction with a merchant;
upon receiving the audible request, determining a digital voice identification code associated with the audible transaction request, wherein the digital voice identification code is determined based on the audible request;
receiving, from a smart assistant device, the digital voice identification code, a smart assistant device identification code, and one or more transaction tokens;
validating, via the smart assistant application module, the digital voice identification code associated with the audible transaction request as being associated with the user and establish a secured active session between a mobile device associated with the user over a wireless network to complete the transaction with the merchant;
receiving, via the smart assistant application module, from the smart assistant device, encrypted transaction details associated with the audible transaction request;
decrypting the encrypted transaction details associated with the audible transaction request, wherein decrypting the encrypted transaction details is conducted based on a smart device identification code or a predetermined encryption key;
determining, via the smart assistant application module, a financial instrument of the user for executing the audible transaction request; and
transmitting, via the smart assistant application module, the transaction details and information about the determined financial instrument of the user for executing the audible transaction request to a financial institution server for execution of a transaction associated with the audible transaction request with the merchant via a separate channel.

9. The computer program product of claim 8, wherein the computer readable instructions further comprise instructions for:
receiving, via a smart assistant device module, the audible transaction request from the user;
obtaining, via the smart assistant device module, transaction details associated with the audible transaction request from a merchant system;
establishing, via the smart assistant device module, a secured active session with a computing device of the user over a wireless network;
determining, via the smart assistant device module, a digital voice ID for the received audible transaction request;
transmitting, via the smart assistant device module, (1) the digital voice ID for the received audible transaction request, (2) a smart assistant device ID, and (3) one or more generated transaction tokens to the computing device of the user; and encrypting, via the smart assistant device module, and transmit the transaction details associated with the audible transaction request to the computing device of the user.

10. The computer program product of claim 8, wherein validating the digital voice identification code associated with the audible transaction request as being associated with the user is based on stored customer reference data and a smart assistant device identification code associated with the smart assistant device.

11. The computer program product of claim 8, wherein:
   determining the financial instrument of the user for executing the audible transaction requests comprises prompting a computing device of the use to display selectable icons that are each associated with one or more financial instruments of the user; and
   receiving an indication from the computing device of the user that the user selected the financial instrument of the user for executing the audible transaction request.

12. The computer program product of claim 8, wherein:
   determining the financial instrument of the user for executing the audible transaction request comprises identifying a predetermined preferred financial instrument of the user; and
   determining that the predetermined preferred financial instrument of the user is an acceptable transaction mechanism based on the transaction details associated with the audible transaction request.

13. The computer program product of claim 8, wherein the computer readable instructions further comprise instructions for:
   in response to transmitting the transaction details and the information about the determined financial instrument of the user for executing the audible transaction request to a financial institution server, transmitting a notification to a merchant system with (1) an indication that the user is authorized for the transaction, (2) a transaction session code, (3) and a transaction identification token.

14. The computer program product of claim 8, wherein the computer readable instructions further comprise instructions for:
   in response to transmitting the transaction details and the information about the determined financial instrument of the user for executing the audible transaction request to a financial institution server, cause a user interface of a user computing device to display a notification of at least an indication that the transaction has been executed and an amount of the transaction.

15. A computer implemented method for employing a smart device for secure event execution, said computer implemented method comprising:
   providing a computing system comprising a computer processing device and a non- transitory computer readable medium, where the computer readable medium comprises configured computer program instruction code, such that when said instruction code is operated by said computer processing device, said computer processing device performs the following operations:
   receiving, via a microphone, a spoken audible request from a user for a transaction with a merchant;
   upon receiving the audible request, determining a digital voice identification code associated with the audible transaction request, wherein the digital voice identification code is determined based on the audible request;
   receiving, from a smart assistant device, the digital voice identification code, a smart assistant device identification code, and one or more transaction tokens;
   validating, via the smart assistant application module, the digital voice identification code associated with the audible transaction request as being associated with the user and establish a secured active session between a mobile device associated with the user over a wireless network to complete the transaction with the merchant;
   receiving, via the smart assistant application module, from the smart assistant device, encrypted transaction details associated with the audible transaction request;
   decrypting the encrypted transaction details associated with the audible transaction request, wherein decrypting the encrypted transaction details is conducted based on a smart device identification code or a predetermined encryption key;
   determining, via the smart assistant application module, a financial instrument of the user for executing the audible transaction request; and
   transmitting, via the smart assistant application module, the transaction details and information about the determined financial instrument of the user for executing the audible transaction request to a financial institution server for execution of a transaction associated with the audible transaction request with the merchant via a separate channel.

16. The computer implemented method of claim 15, wherein the computer readable instructions further comprise instructions for:
   receiving, via a smart assistant device module, the audible transaction request from the user;
   obtaining, via the smart assistant device module, transaction details associated with the audible transaction request from a merchant system;
   establishing, via the smart assistant device module, a secured active session with a computing device of the user over a wireless network;
   determining, via the smart assistant device module, a digital voice ID for the received audible transaction request;
   transmitting, via the smart assistant device module, (1) the digital voice ID for the received audible transaction request, (2) a smart assistant device ID, and (3) one or more generated transaction tokens to the computing device of the user; and
   encrypting, via the smart assistant device module, and transmit the transaction details associated with the audible transaction request to the computing device of the user.

17. The computer implemented method of claim 15, wherein validating the digital voice identification code associated with the audible transaction request as being associated with the user is based on stored customer reference data and a smart assistant device identification code associated with the smart assistant device.

* * * * *